Figure 1:
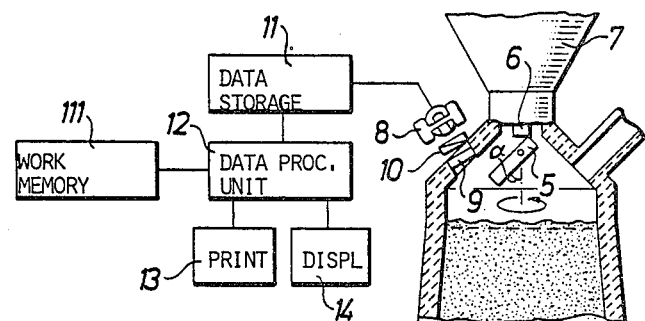

United States Patent [19]

Wiklund et al.

[11] 4,339,664

[45] Jul. 13, 1982

[54] METHOD AND APPARATUS FOR REGISTRATION OF TOPOGRAPHY

[75] Inventors: Rudolf Wiklund, Täby; Lennart Nordström, Lidingö, both of Sweden

[73] Assignee: Pharos AB, Lidingö, Sweden

[21] Appl. No.: 141,733

[22] Filed: Apr. 18, 1980

[30] Foreign Application Priority Data

Apr. 18, 1979 [SE] Sweden ........................ 7903368

[51] Int. Cl.³ ............................................. G01N 21/85
[52] U.S. Cl. .................................. 250/577; 250/560
[58] Field of Search ...................... 250/577, 560, 561; 356/4, 1

[56] References Cited

FOREIGN PATENT DOCUMENTS 2701803 8/1977 Fed. Rep. of Germany .
7202517 2/1976 Sweden .

*Primary Examiner*—David C. Nelms
*Assistant Examiner*—Darwin R. Hostetter
*Attorney, Agent, or Firm*—Pollock, Vande Sande & Priddy

[57] ABSTRACT

This invention relates to a method of registering the tophography and height level of the charged mass in a blast furnace. A distance meter for measurement by means of direct reflection against the surface is placed in the vicinity of the top of the blast furnace, appropriately at an inspection window located there. The distance meter is equipped with an aiming device with which the measuring direction of the distance meter is aimable at selected parts of the surface of the charged mass. A computing unit such as a micro- or minicomputer calculates, on the basis of the siting of the distance meter, the set angles of the aiming device for measurement direction and the results of performed distance measurements, calculates the positions for the different measuring points and presents these in analog or digital form.

11 Claims, 11 Drawing Figures

METHOD AND APPARATUS FOR REGISTRATION OF TOPOGRAPHY

The present invention relates to an apparatus and process for determining the topography of a charged mass in a blast furnace.

Modern blast furnaces are being made with increasingly larger diameters in order to be as economical as possible. A larger furnace gives smaller energy losses per unit volume of produced iron than does a smaller furnace. A large furnace, however, is far more susceptible to disturbances than a small one, the reason being that it is considerably more difficult to accomplish symmetrical heating around the center axis of the furnace the bigger the furnace is. It is highly important for the furnace to operate as symmetrically as possible around its center axis so that the hottest part of the furnace lies as close as possible to said center axis. If the furnace is heated unevenly, the furnace wall will also be unevenly heated and in really unfortunate circumstances, part of the furnace wall may be heated to such an extent as to cause said part to fracture. For this reason, numerous methods for monitoring the state of the furnace have been developed and work is continuously being carried out in order to find still better and more reliable methods of assuring that the furnace operates in an optimal manner. According to one such method, the surface temperature of the charge is continuously monitored by equipment providing an infrared image of the surface of the charge, said equipment being located at the top of the furnace and viewable through an inspection window. This method provides important information on the state of the furnace during its operation but it is impossible to determine with such equipment directly after charging whether or not the charge has been portioned in the intended properly balanced proportions or not. Nor is it possible with such equipment to decide whether the total level of the charge surface is above or below a predetermined level.

For this reason, it has been found necessary to complement the examination with an infrared camera with information on the surface level and its variation. This is accomplished by the method according to the invention, as defined by the claims.

Figure 2:
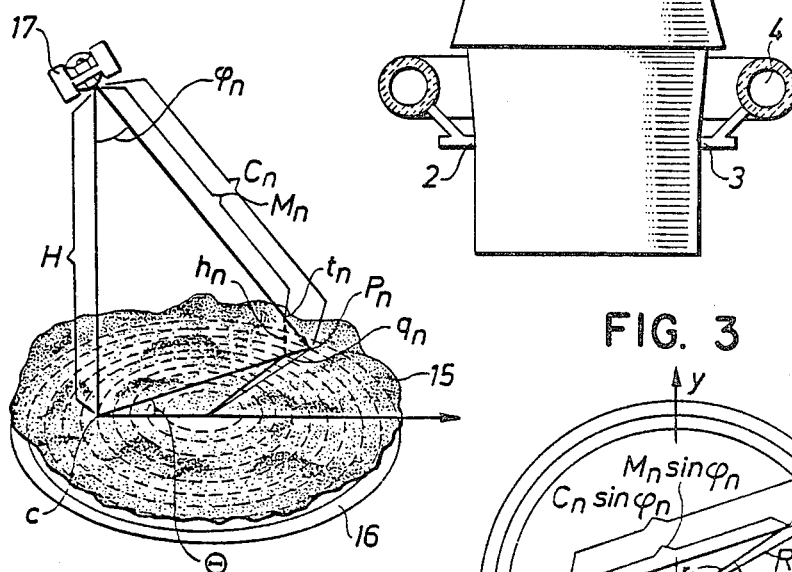
Figure 3:
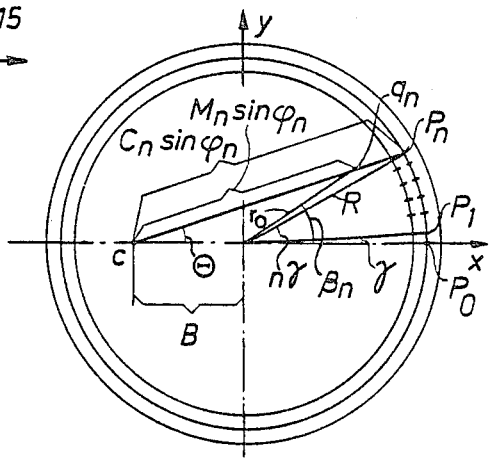
Figure 4:
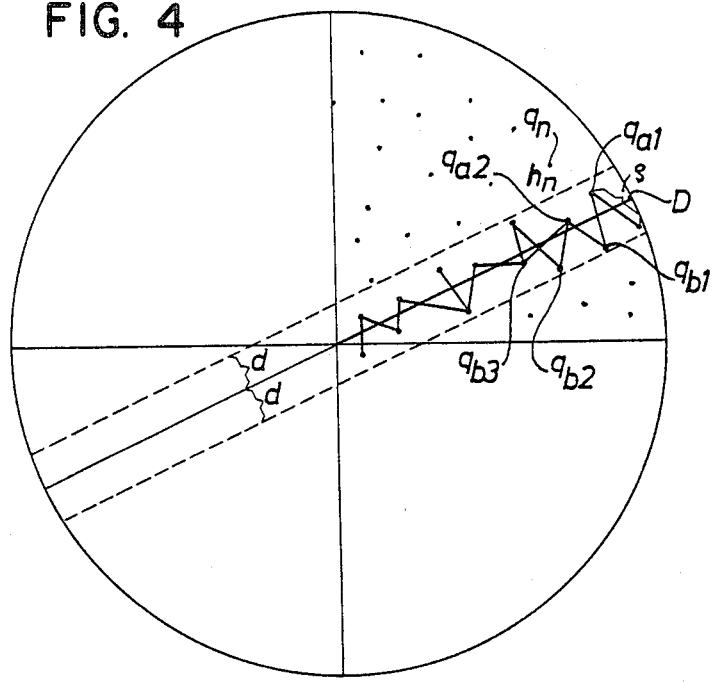
Figure 5:
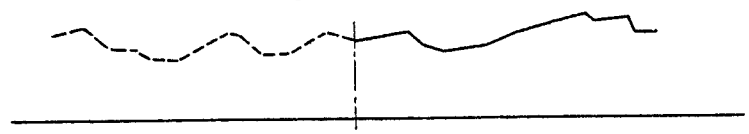
Figure 6:
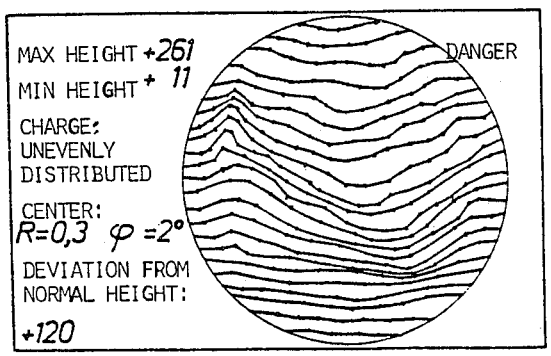
Figure 7:
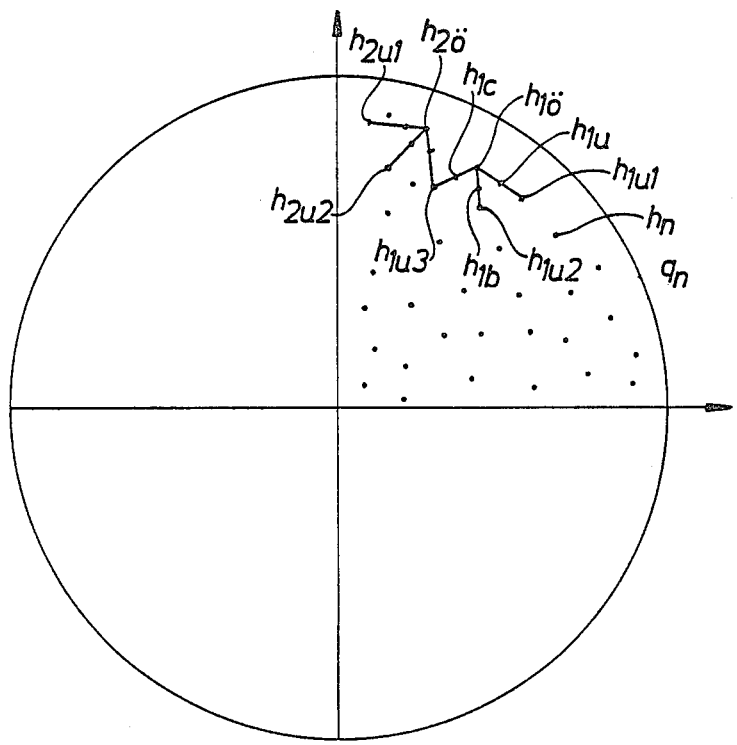
Figure 8:
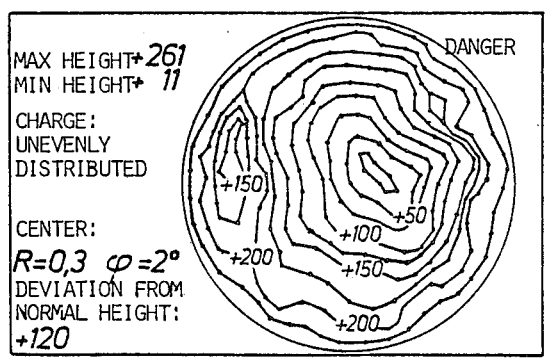
Figure 9:
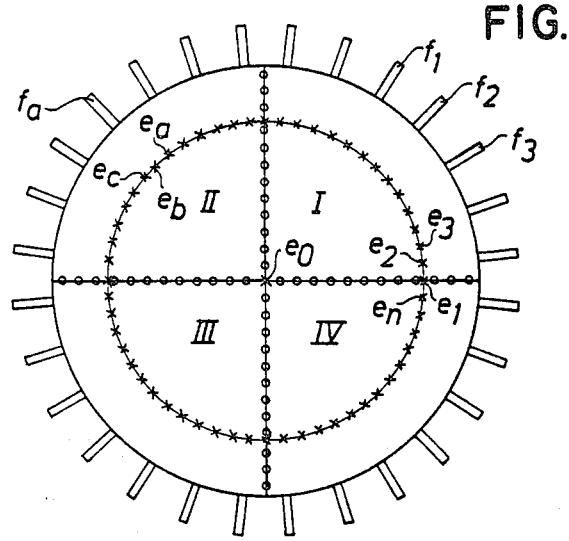
Figure 10:
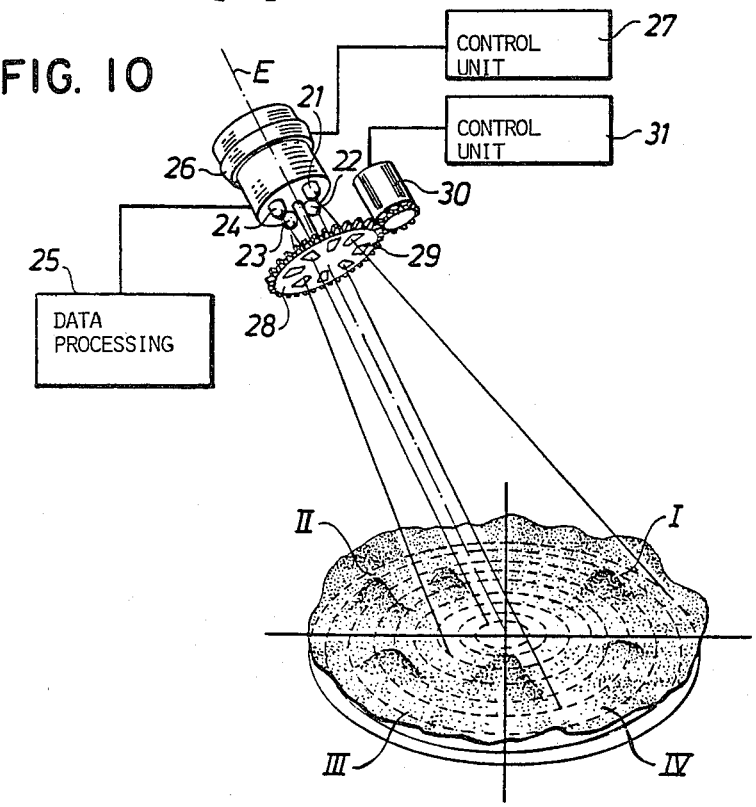
Figure 11:
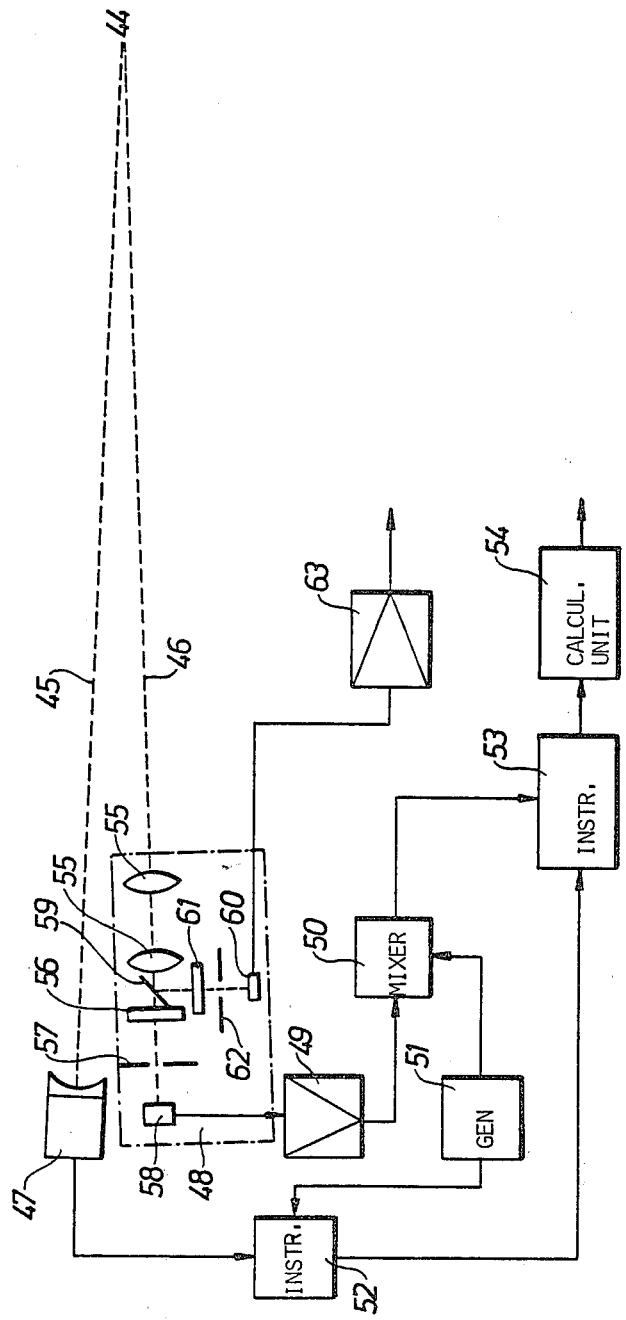

An example of the invention will now be described in more detail and with reference to the accompanying drawings, wherein FIG. 1 shows a blast furnace, partly in section, with a distance meter and associated circuits drawn schematically, FIG. 2 shows schematically a perspective view of a charging surface in a blast furnace with a distance meter, FIG. 3 is a plan view of a reference surface with inserted projected parts of the charging surface, FIG. 4 is a principle sketch of the reference surface with inserted projection points and an embodiment shown in principle of the height profile marking along an imaginary line, FIG. 5 illustrates an obtained height profile, FIG. 6 shows a screen with a height relief map, FIG. 7 is a principle sketch of the reference surface with plotted projection points and an embodiment of the height curve marking, FIG. 8 shows a screen with a height curve map, FIG. 9 shows a principle sketch to explain a measurement sequence for an embodiment of the invention, FIG. 10 shows schematically a perspective view of a charging surface with a distance meter according to yet another embodiment of the invention and FIG. 11 shows a block diagram of a distance meter provided with an IR-detector as a supplement.

FIG. 1 illustrates a blast furnace 1 having in its hearth section a plurality of tuyeres 2, 3 connected to an annular drum 4 extending around the furnace. Preheated blast air is supplied to the annular drum, distributed through the drum and blown into the furnace through the tuyeres 2, 3.

Disposed in the upper section of the furnace, which is shown partly in cross-section, is a chute 5, which is tiltable in different directions a vertical line and which is rotatable around the center axis of the furnace. Above the chute and centered around the center axis of the furnace is a pipe 6 through which material for charging is emptied from the hopper 7 down into the chute 5 in predetermined proportions, at predetermined locations on the surface of the charge determined by the angular position of the chute 5 in relation to and rotational position around the center axis of the furnace. In principle, there are four different forms under which charging can be performed. In ring-charging, the chute 5 is rotated continuously around the centre axis during charging so that the material is distributed over the charge surface in the form of a ring. In spiral-charging, the material is distributed uniformly over the entire charge surface in that the chute is both rotated around and rocked against the center axis, so that the material is deposited in the form of several adjacent rings. In segment distribution, a segment surface is selected by an operator and the chute swings to and fro over the selected segment until the chute is empty. In some cases, several essentially uniformly distributed segments are selected. In spot distribution, the material is distributed out onto one or more points on the charge surface selected by the operator. The first two of the aforesaid charging methods can be performed automatically whereas the last two must be performed under control of an operator. This operator should then have instruments at his disposal in order to make his appraisals in a reliable manner. One such instrument is the distance meter 8 provided according to the invention and located adjacent to an inspection window 9 in the uppermost part of the furnace above the charge surface. Shown in the figure is an optical-type scanning device 10, located between the distance meter and the inspection window. The scanning device is shown in the figure to comprise two wedge-shaped prisms, which can be rotated and displaced relative to each other and to the distance meter so that the beam passage from and to the latter can be oriented in an optional direction. Any other stagewise adjustable scanning device may be used, for example one or two tiltable mirrors, etc. It is also possible instead of an optical scanning device between the instrument and the inspection window to place the distance meter on a rotatable and tiltable platform. The important point in this context is for the beam sweep from and to the instrument to be able to take place in stages, since the scanning device must remain still at the instant of measuring in order not to distort the result of the measurement. In accordance with this invention, several measurements are performed against the charge surface in accordance with a selected pattern so that measuring is performed against selected parts of the surface.

The results of the measurements, i.e. the distances obtained, are fed to a work memory 11 for temporary storage together with information on the state of the "scanning" device for each separate measurement. A data processing center 12 such as a microcomputer or minicomputer performs computations on the basis of the data supplied to it and stores the computation results in a work memory 11. How this is done will become more clearly evident further on in this description. The results of the calculations are presented both on a printer 13 and on a screen 14, appropriately in the coordinate system of the furnace.

Shown schematically in FIG. 2 is a view of the charging surface 15 in the furnace and an imaginary reference surface 16 which in the figure—for the sake of clarity—is shown to lie under the true surface. The reference surface may have any suitable shape whatsoever. In FIG. 2 it is flat but is also both conceivable and appropriate to choose a reference surface with the shape the surface is to have in the ideal case. It is obvious that the reference surface is fixed in space and that the true surface can then be above, in the middle of or below the reference surface. A distance meter 7 which in the embodiment shown in the figure is placed on a moveable foundation measures the distance to the charge surface in numerous points located close to one another in accordance with a predetermined pattern. It should be observed in this context that the given pattern is based on the imaginary reference surface, so that the distance meter is aimed at an imagined patter on this. In the case illustrated by FIG. 2, the pattern consists of points along several adjacent circles on the plane reference surface but it is perfectly evident that the scan can be performed along several adjacent straight lines or in analogy with TV scanning or by some other means, as will be described in greater detail further on. Shown in FIG. 2 is measurement towards one point in order to illustrate how the distance meter is aimed and how calculation of desired results on the basis of the aiming of the distance meter and obtained measuring results is performed. FIG. 3 shows on a larger scale the reference plane and a point $q_n$ which constitutes the hit point $t_n$ on the true plane projected against the reference plane. Measurement against a reference point $p_n$ has been drawn in and serves to illustrate the calculations necessary for each individual point.

Through the selected choice of position for the reference surface height H for the position of the distance meter above the surface is determined. The location of the inspection window is found from the furnace design drawings, thus enabling the projection thereof on the reference plane to be determined, whereby the distance B between the projection point and the center for the plane is obtained. In the figures it is assumed that the projection point lies on the axis through the center of the furnace in the reference plane and that the measurement points along one of the measuring circles, which has been shown as an example, commence where the circle intersects the positive axis and lies uniformly distributed around the circle with the sector angle (see FIG. 3). In the example in FIG. 3, measurement is performed against point $p_n$ on the scanning circle in the reference plane with the radius R and the sector angle against the positive axis equal to $n\gamma$. The line-up $\theta_n$ in the horizontal direction and $\phi_n$ in the vertical direction is calculated geometrically on the basis of the known values of H, R and n In addition, the distance from the distance meter to the point $p_n$ is calculated. Subsequently, distance measuring is performed against the true surface in the direction of point $p_n$, whereupon the distance $M_n - t_n$ on the true surface is indicated. The height $h_n$ of the normal to the imagined surface and the point $t_n$ of the true surface is calculated with regularity. Also calculated is the position of the hit point $q_n$ of the normal with the imagined surface, using known geometrical methods. The calculated coordinate for position $q_n$ and height $h_n$ are stored in a memory 111 belonging to the computer unit. It should be observed that the pattern of measuring coordinates obtained upon completion of a measuring sequence and stored in the memory is not uniformly dispersed over the imagined surface, since waviness in the true surface gives rise to displacements in the scanning pattern after the stated calculations have been performed. This implies that the obtained measuring results are not at uniform distances from one another along neatly arranged circles.

FIG. 4 shows the result of a series of measurements plotted within a quadrant of the imagined surface. A value $h_n$ of the height to the true surface belongs to each point $q_n$. If in accordance with the invention a raised section right across the surface along a line D is to be plotted, it will be found that relatively few points end up on this line, the smaller the number of points the fewer measuring points included in a measuring series. The pattern of points illustrated by FIG. 4 is, however, too sparse to permit a realistic appraisal of the height distribution above the surface, but the principle for calculation of the height distribution curve is best illustrated with a sparse pattern. The density of the pattern selected in specific cases is a matter of balance between how close together anticipated irregularities may be expected to lie and how steep they may conceivably be and how rapidly the surface can be expected to change. A distance measuring operation takes a certain amount of time to perform, as does every alteration of the setting between consecutive measurements.

As evident from FIG. 4, an area is selected with a specific distance d from the intended line D out and every point $Q_{ai}$ on one side of the line D within the selected area is matched with the points $q_{bi}$ lying within the selected area on the other side of the line D and within a certain predetermined specific distance from point $q_{ai}$. It is shown in the figure that only point $q_{b1}$ lies within the distance from point $q_{a1}$ whereas points $q_{b1}$, $q_{b2}$, $q_{b3}$ lie within the distance from point $q_{a2}$, etc. The calculation is made where line D intersects each fully drawn line between all pairs of matched points. The heights for the matched points are taken from the respective memory places and on the assumption that the height distribution between each pair of matched points runs linearly the height of all intersection points along line D is calculated. The height curve in FIG. 5 is drawn on a plotter or on a screen, straight connection being made between all adjacent points.

In cases when a relatively dense "sweep" pattern has been selected, instead of the matching procedure described above, it is possible for the area on either side of the wanted line to be selected narrowly and for all the points between that area to be plotted normally against the line with their special heights retained. This gives significantly fewer calculating operations for the computer to perform.

The line D shown in FIG. 4 is drawn through the origin but it is perfectly obvious that any other line whatsoever may be drawn and does not even need to be linear. The same principle for height calculation and marking as described above is applicable. For example, height curves along several parallel lines situated close together may be calculated and presented on a screen in the form of a height relief map. The levels in the height relief lines may also be presented in different colours on the screen so that, for example, the lowest level is reproduced in red and the highest in blue, and the remainder of the curve with an appropriate colour scale in between. Shown in FIG. 6 is an example of a height relief map presented on a screen together with texts showing calculated data of interest to an operator. Shown in the figure is a charge surface which is highly irregularly distributed. Indication that the situation is critical is given on the screen in that the word DANGER flashes in the top right-hand corner.

In accordance with the invention, height level curves of the charge surface are also to be drawn. If the points in the "sweep" pattern have been selected very close together, for each height level which is wanted to be plotted points may be connected for which one height is indicated that lies within predetermined deviation limits from the valid height level. Thus, each such indicated point is connected with the two nearest points with the same indication. Alternatively, the computer program may instead be arranged so that each indicated point is connected with all indicated points lying at a predetermined distance from the valid point and with the same indication.

If a relatively sparse "sweep" pattern has been selected, the following procedure is instead adopted. The point with the highest height is indicated. The wanted height level below this height is determined and all points with heights between the highest height and the selected uppermost height level are indicated. The computer then seeks all points at a predetermined distance from each selected point and determines whether the height marking for these points lies above or below the height level for the height level curve concerned. For those points where the height level is below the height level curve concerned, these are matched with the associated point with a higher height and on the assumption that the height distribution between the two points in each pair runs linearly, a calculation is made of the point between the two points at which the wanted height level occurs, i.e. points $h_{1a}$ between point $h_{1ö}$ with a higher height than the height level and point $h_{1u}$, with a lower height level, $h_{1b}$ between $h_{1ö}$ and another point $h_{1u2}$ matched with $h_{1ö}$, etc. The calculated points for the highest height level curve are plotted on the height level curve on the screen in FIG. 8 and each point is connected with the two nearest points or with all points lying within a predetermined distance. As shown in FIG. 8, a numerical reference is inserted at the bottom or at some other appropriate place on the curve to designate the height level.

When the highest height level is drawn, calculation is performed on the next level in that all points with marked heights between the uppermost and the next uppermost height level are found by the computer and matched with nearby points with height markings below the next uppermost height level. The points between each pair of matched points with the height of the next highest height level curve are calculated and marked on the height level curve and the next height level curve is drawn in. When drawing this latter curve, it should be observed that if the previously plotted uppermost height level curve lies between two closely situated points with the next uppermost height level, these points are not selected for connection even if they should lie nearest to each other. These two points are thus connected with each of two other points lying close to each other where the connection line does not intersect the uppermost height level curve.

Calculation and marking of all subsequent height level curves take place in analogy with the above until all requisite curves have been drawn.

Instead of drawing the highest height level curve first, the height level curves may naturally be drawn consecutively, starting from the lowest curve. All positions are calculated with reference to the furnace coordinates.

In the screen shown in FIG. 8 only every second height level curve is provided with height marking indicated with numerals since it is evident that it is unnecessary to provide each height curve with such marking. As an alternative or complement to this, the different height curves may be reproduced in different colors, where for example red indicates the lowest level and blue the highest, with a suitable color scale in between for the other curves. In addition, the screen beside the height level map is provided with text which gives information on the state of the furnace. Since, in the illustrated case, the charge is highly irregularly distributed, the text DANGER flashes in the top right-hand corner.

As has been mentioned, certain inconveniences are incurred by the use of the method according to the invention in that each separate distance measurement to a point on the surface of the charge must take a certain time to perform. For each point, the setting of the scanning device and the actual measurement procedure takes a time in the order of one second to complete. It is therefore vital to reduce the number of measuring points to a minimum but, despite this, to obtain a reliable and dependable result. According to a further embodiment of the invention, measurements are made only against certain special points on the surface of the charge, which are of special importance for checking the function of the furnace. Shown schematically in FIG. 9 is a charge surface, viewed from above with the position for the furnace tuyeres $f_1$, $f_2$, $f_3$, . . . marked schematically around the furnace. In the case illustrated, there are 28 tuyeres, but this number may vary within fairly wide limits and is dependent upon the size of the furnace. The number 28 is indicative of a very large furnace, and in fact it is for large furnaces that the method according to the invention is particularly useful.

In order to perform a measuring operation with as few measuring points as possible, it is appropriate to concentrate the measurements on points of particularly great significance for the overall result. Shown with an (x) in the figure is a type of measurement series involving relatively few measurements. Initially, a measurement is made to the centre $e_0$ of the charge surface. The value of the height which is then obtained by means of the same calculations as those described above serves as the basic level for the reference surface. The reference surface, moreover, is in this case a surface with ideal topography. The implication is that all other measurements made against the reference surface should adopt values within a predetermined permissible variation range. The computer calculates the setting of $\phi'_i$ and $\theta_i$ (see FIG. 2 and 3) for each measuring point on the basis of the results of the measurement to the middle of the charge surface and the ideal topography for that surface stored in the computer. It also calculates what distance the measurement to each measuring point to the ideal reference surface should give. If the true measurement value for an actual point lies beyond the calculated distance with a predetermined deviation, then in all probability there is a fault.

Measurements are made against the imagined reference surface in a ring at a specific distance from the wall of the furnace. The distance to points $e_1, e_2, e_3, \ldots$ is measured, where every second point is sited immediately above a tuyere and every second point in between two tuyeres. With twentyeight tuyeres, this measuring sequence gives a measurement series comprising a circle of fifty seven measurement points.

If a special deviation, e.g. a longer distance than the calculated distance, should occur for a special area such as for points $e_a, e_b, e_c$ in quadrant II, the area around these points is examined in greater detail. The deviation may be due for instance to the fact that the tuyere $f_a$ has too large or too small feed of blast air of the like. If this is not so, an extra charging may perhaps be necessary in this area.

Shown with marked rings (o) in FIG. 9 is another type of measuring point sequence which is performed diagonally across the charge surface along two lines which are perpendicular to each other and intersect each other in the center of the charge surface. This measuring point sequence can be used either instead of the measuring sequence marked with an x or as a complement to this. It is also possible for every second measuring series to be performed along the ring marked with an x and every other one along the ring-marked cross. In both cases, the first measurement in the series is performed against the center of the charge surface.

In order for the result of the measurements to be presentable in a manner readily interpretable by the operator on the screen, each measuring point is shown on a screen with the pattern illustrated by FIG. 9, the points where the distance calculated by the computer within the permissible variation range coincides with that obtained in the course of the measurement being reproduced in white; the points where the measured distance is longer than the calculated distance being reproduced in yellow, orange and red depending on the severity of the deviation; and the points where the measured distance is shorter than the calculated being reproduced in green, turquoise and blue, depending on the severity of the deviation. A color indication of this kind gives a picture which is very easy for the operator to interpret. Naturally, what is indicated with different colors is the calculated deviation in height. The computer calculates this deviation and is programmed to color the points on the screen in accordance with the actual deviation range for the points in question in a per se conventional manner. It is obvious that other scanning patterns than that shown in FIG. 9 may also be appropriate.

FIG. 10 shows yet another embodiment of a distance meter placed by an inspection window (not shown) above the charge surface. This distance meter is provided with four separate optic units 20, 21, 22, 23, 24, placed on a common mounting 25. The mounting is rotatably placed on a rotating member 26 which in selected stages rotates the mounting around a rotational axis E which is so set that it passes through or very close to the center of the imagined plane. The rotating member 26 rotates the mounting 25 under the control of a control unit 27. The rotating member may, for example, be a resolver, in which case the control unit to the two secondary windings gives an alternating voltage with amplitudes corresponding to calculated sinusoidal and cosinusoidal values for the rotation angle at which the mounting is to be set. The primary winding of the resolver is driven with alternating voltage at constant amplitude.

Provided in front of the distance meter is a rotatable disc 28 which is furnished with a number of wedge-shaped prisms 29 arranged in a ring with mutually different angles of refraction. The number of prisms is uniformly visible by the number of optic units, i.e. four in the shown embodiment. Shown in the figure is a disc with eight prisms but a disc with twelve or 16 prisms is also feasible. The disc 28 is rotatable in appropriate steps to place different prisms 29 in the beam passage for the separate optic units 20–24 by means of a step motor 30 under the control of a control unit 31. The center of the disc is so located that the axis E of the distance meter mounting runs through this, but the rotational axis of the disc itself has a certain angle in relation to the axis E to compensate for the distance meter having to be placed obliquely in relation to the imagined plane. Alternatively the optic units can be individually adjusted for the same purpose.

In performing a measuring operation, the mounting is rotated to and fro through an angle of 90°, so that the measurements from the separate otic units each represent measurement against their own quadrant of the imagined surface. The inclination of the rotational axis of the disc 28 against the axis E and the setting of the different optic units is such that with the different prisms 29 placed in the beam passage, a deflection of the latter can take place from the center to the periphery in each quadrant.

The measuring results are computed by the associated data processing unit and presented on a printer and/or screen entirely in analogy with the manner described heretofore.

The method according to the present invention is particularly suitable for distance measuring against the charge surface in a blast furnace and this imposes special demands on the apparatus used. Firstly, it is not impossible to place a reflector on the charge surface and consequently the distance meter must be able to function without a reflector. The implication is that an electro-optic distance meter with a narrow-wave information carrier such as laser light and with optical filtration for disturbance suppression should be used. A distance meter of this kind is described in German Pat. No. P 25 51 965. Secondly, the atmosphere above the surface is such that it is permeable to the light emitted by the distance meter only during certain, relatively brief intervals of time. These intervals of time must be exploited for the distance measuring and the distance meter must naturally be so disposed that it repeats a distance measurement to an intended point in the event that its receiver does not receive a reflected signal from the surface. Thirdly, the environment above the surface is such that particles of various kinds can be thrown around in the area above the surface. In performing a distance measuring operation, measurement may occur against such a particle. It is therefore occasionally appropriate to allow each distance measurement to each measurement point to comprise a series of consecutively performed separate measurements. All measurement results deviating by a certain predetermined value from the measurement with the longest obtained distance are rejected and the mean value of the remaining measurement results is calculated and serves to provide a basis for the calculations described above, based on the measurement results for the point concerned.

Since the distance to the measurement points on the charge surface is known within 10 m, the distance meter only needs to perform measurements with one modulation frequency which significantly reduces the time for a distance measurement. The distance meter is then of so-called phase-comparing type. It is possible for performance of the method according to the invention to use a distance meter in which the time it takes for the light to reach and return from the charge surface is measured, but distance meters of phase-comparing type are preferable on account of their greater accuracy.

A very useful apparatus is obtained if the distance meter is equipped with an IR-detector which is so disposed that for each distance measurement against a measurement point on the surface the heat of that surface at this point is also indicated. The implication is that both distance and heat for the same point can be presented simultaneously, for instance on a computer screen. If the presentation is made in the form of a height relief map according to FIG. 6 it is not necessary to have different height levels shown with different colors. Instead, the color marking can indicate temperature. By this means, both the height and the temperature of the surface are presented in a readily interpretable manner. It is naturally also possible to introduce colour markings dependent upon the temperature of the height relief map shown in FIG. 8. The height levels for the different curves are, of course, also stated in plain language on the picture.

FIG. 11 shows a block diagram of a distance meter which is also provided with a means of temperature indication.

Reference numeral 44 designates a measuring point to which the distance is measured by means of the apparatus which emits a beam 45 to said point and receives the reflected beam 46.

The apparatus comprises an electro-optical distance measuring instrument of the phase-comparison type which includes a transmitter part 47 from which a monochromatic, modulated light beam is emitted. As is well known in the art the distance measurement in such an instrument is calculated from the phase difference between the modulation wave of the transmitted and the received light beam. The modulation shall have a frequency which permits sufficient distance resolution, for example 0.3 and 30 MHz. The radiation source in the transmitter part 47 is preferably a laser, which emits radiation of a wavelength which on the one hand must lie within a wavelength region for which photo-detectors are sensitive and therefore must lie within the wavelength region of the self-radiation of the furnace, but on the other hand must have a favorable signal-noise relationship and so must differ from the wavelength where the furnace radiation per bandwidth has its maximum. The emitted radiation wavelength is of course substantially different to the wavelength of the modulation wave. In accordance with the invention, the transmitter part 47 also comprises focusing means for focusing the transmitted radiation to the point 44. After reflection at the point 44, transmitted radiation is reflected against a receiver 48 which comprises a lens system 55, behind which a filter 56 is mounted. The filter 56 is tunable to the radiation emitted from the instrument and its bandwidth is as narrow as possible with consideration to the temperature variations of the instrument which may occur. Further there is a diaphragm 57 in the receiver 48 whose purpose is to ensure that a detector 58 located behind the diaphragm 57 only detects radiation from a very limited area around the measuring point 44 in the furnace i.e. is hit substantially by reflected radiation from the instrument. In other words, the diaphragm 57 prevents as far as possible the self-radiation of the furnace from reaching the detector 58.

Disposed between the lens system 55 and the filter 56 is an inclined semi-transparent mirror, which directs part of the radiation from the furnace towards an IR-detector 60 via a filter 61, which filters off a narrow wavelength region around the wavelength region of the transmitted laser bean and a diaphragm 62. It is also possible to give the element 59 such an embodiment that it reflects all radiation except a relative-narrow wavelength region around the wavelength region of the laser radiation, for which it is entirely transparent.

Other locations of the IR-detector than that shown are naturally also feasible. The IR-detector may possibly be provided with a completely separate optic system. The essential feature is that the IR-detector detects the heat radiation in the same point to which distance measurement is performed.

In the receiver 48 the modulation of the reflected radiation is transformed into an electrical signal which is fed to an amplifier 49. In order to make the measuring more reliable a frequency transposer or mixer 50 is arranged after the amplifier to transpose the signal received. This frequency transposition takes place by means of a signal from a generator 51. The signal from the generator 51 has a frequency which is intended to be close to the modulation frequency of the signal received and thereby a transposed signal of comparatively low frequency is received after filtering the signal at the output of the member 50, This transposed low-frequency signal contains phase information from the signal received, and therefore phase measurement can just as well be made on this signal as on the modulated, relatively high-frequency signal received, which means that the phase comparison circuits can be made less complicated. Said phase comparison is accomplished in instrument 53, to which also a reference signal from the transmiter part 47 is led, and this reference signal is also frequency transposed to said low-frequency in instrument 52. This frequency transposition is also made by means of a signal from the generator 51. How the phase comparison is made by the instrument 53 is well known in the art and will not be described in more detail since it does not form part of the present invention.

Output data from instrument 53 is then fed manually or automatically to a calculation unit 54 for further calculation.

The output signal from the calculation unit 54 is fed to the work memory 11 shown in FIG. 1 for further processing. The signal from the IR-detector 60 is also fed via an amplifier to the work memory 11. The data processing center 12 processes the signals in the manner indicated earlier in the description with the addition that processing also takes place of the signals from the IR-detector.

Numerous different modifications are possible within the scope of the invention.

We claim:

1. Apparatus for determining the topography of a blast furnace charge mass comprising:
   distance measuring means for measuring the distance of a plurality of surface points on said means from a point exterior to said blast furnace of the phase comparison type, said measuring means including means for projecting a narrow wave information light beam to said surface points from said exterior point, and for detecting reflections from restricted areas containing said points indicative of said distance;

computer means connected to receive a signal from said means for projecting indicating angular coordinates of said beam, and for receiving signal components from said means for detecting said reflections, said computer providing distance of said points from said beam origination point; and means for displaying each of said distances with respect to reference coordinates of said blast furnace, whereby a simulation of said mass is produced.

2. The apparatus of claim 1 wherein said computing means further provides information for displaying said plurality of points with respect to a horizontal plane of said furnace.

3. The apparatus of claim 1 wherein said means for projecting a beam and detecting said reflections comprises a beam deflector including a tiltable mirror.

4. The apparatus of claim 1 wherein said means for projecting a beam and detecting said reflections comprises a double wedge prism including a plurality of wedge prisms; and means supporting said wedge prisms for rotation whereby one of said wedge prisms is rotatable into the path of said beam.

5. An apparatus of claim 1 further comprising means for storing a predetermined set of point coordinates of said mass for measuring the respective heights thereof, and means for positioning said beam to said point coordinates whereby the height of said mass at said coordinates is measured.

6. An apparatus according to any of claims 1, or 2, wherein the distance measuring means is of electro-optic type with a narrow wave information carrier, and includes optic filtration for disturbance suppression.

7. An apparatus according to claim 1, wherein said means for displaying includes a screen on which height curves and/or height sections above the surface of the charged mass are presented.

8. An apparatus according to claim 7, wherein the screen represents the topography of the surface of the charged mass in different colors for different heights.

9. An apparatus according to claim 7, wherein the screen presents the deviation in height of said points from a predetermined normal topography of the surface of the charged mass in different colors representing different deviations in height from the normal topography surface.

10. An apparatus according to claim 1, wherein the distance measuring means is supplemented with an IR-detector for determining the temperature of a point to which distance measurement is performed.

11. An apparatus according to claims 7 or 10, wherein said screen provides color representation of topography curves in different colors for different temperatures.

* * * * *

UNITED STATES PATENT AND TRADEMARK OFFICE
CERTIFICATE OF CORRECTION

PATENT NO. : 4,339,664

DATED : July 13, 1982

INVENTOR(S) : Wiklund, et al

It is certified that error appears in the above—identified patent and that said Letters Patent is hereby corrected as shown below:

Column 10, line 68, delete "means" and insert --mass--.

Signed and Sealed this

Sixteenth Day of November 1982

[SEAL]

Attest:

GERALD J. MOSSINGHOFF

Attesting Officer          Commissioner of Patents and Trademarks